United States Patent [19]
Ricciuti, Jr.

[11] Patent Number: 5,923,527
[45] Date of Patent: Jul. 13, 1999

[54] SAFE ELECTRICAL INTERCONNECTION BOX AND METHODS OF SAFE ELECTRICAL INTERCONNECTION

[75] Inventor: Louis Ricciuti, Jr., Darby, Pa.

[73] Assignee: Liberty Technologies, Inc., Conshohocken, Pa.

[21] Appl. No.: 08/756,418

[22] Filed: Nov. 29, 1996

[51] Int. Cl.[6] .................................................. H02B 1/26
[52] U.S. Cl. ...................................... 361/641; 174/50.52
[58] Field of Search ........................ 174/50.52; 361/622, 361/623, 627, 641, 644, 647–650, 724, 785, 823

[56] References Cited

U.S. PATENT DOCUMENTS

| | | | |
|---|---|---|---|
| 1,148,699 | 8/1915 | McWilliams | 361/644 |
| 2,114,017 | 5/1938 | Pring | 361/641 |
| 3,610,810 | 10/1971 | Fribley, Jr. | 361/641 |
| 5,029,597 | 7/1991 | Leon . | |
| 5,225,961 | 7/1993 | Zander et al. | 361/356 |
| 5,396,167 | 3/1995 | Leon . | |
| 5,519,300 | 5/1996 | Leon et al. . | |
| 5,521,482 | 5/1996 | Lang et al. . | |

*Primary Examiner*—Gregory D. Thompson
*Attorney, Agent, or Firm*—Panitch Schwarze Jacobs & Nadel, P.C.

[57] ABSTRACT

A safe electrical interconnection box includes a rear wall, a front panel and a plurality of lateral walls extending between the rear wall and front panel so as to define an enclosed interior space. The front panel forms part of a cover which is movable sufficiently so as to provide an access opening into the enclosed interior space. At least one and typically three current probe attachment fixtures are located within the interior space, suggestedly mounted on a plate which itself is mounted within the box. Also provided are one or more socket-type electrical connectors with pin receiving holes mounted on the separate plate. Preferably, at least one connector is multi-holed and another is single-holed. In one example, the fixtures and multi-hole connector are coupled with a polyphase high voltage power supply connected through the cabinet with a polyphase high voltage electric motor. Individual leads are run in closed, current carrying loops through separate fixtures from the separate phases of the power supply either directly or typically through current transformers. Individual leads are extended from the separate phases of the power supply to the multi-hole connector in open circuit connections also either directly or through voltage transformers. The single-hole connector is coupled to ground.

15 Claims, 2 Drawing Sheets

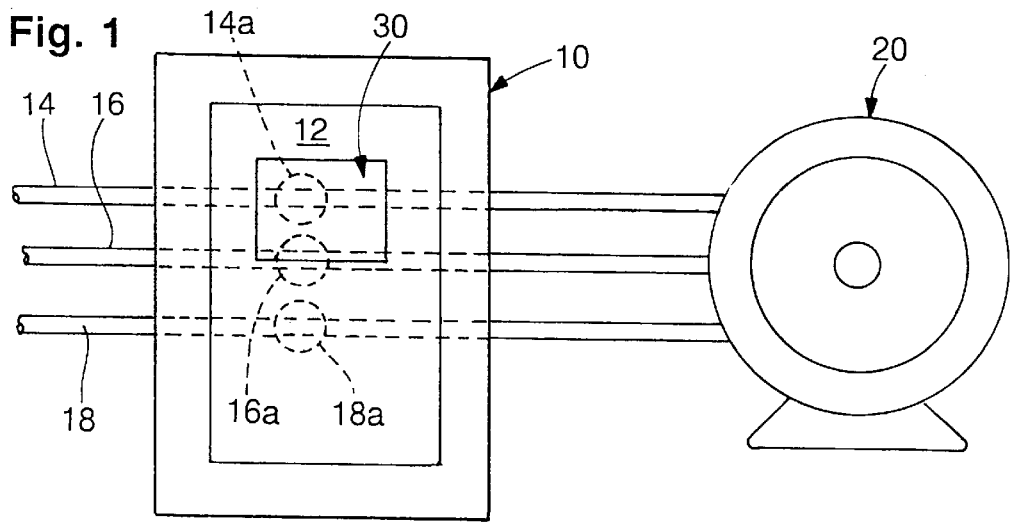
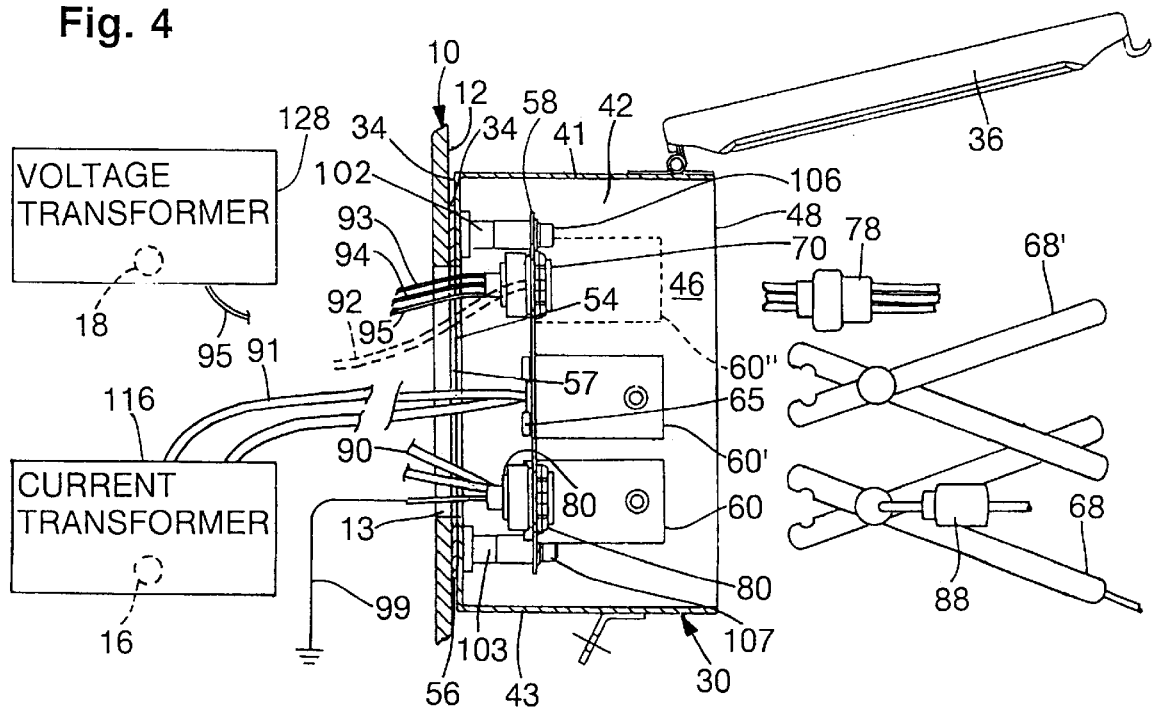

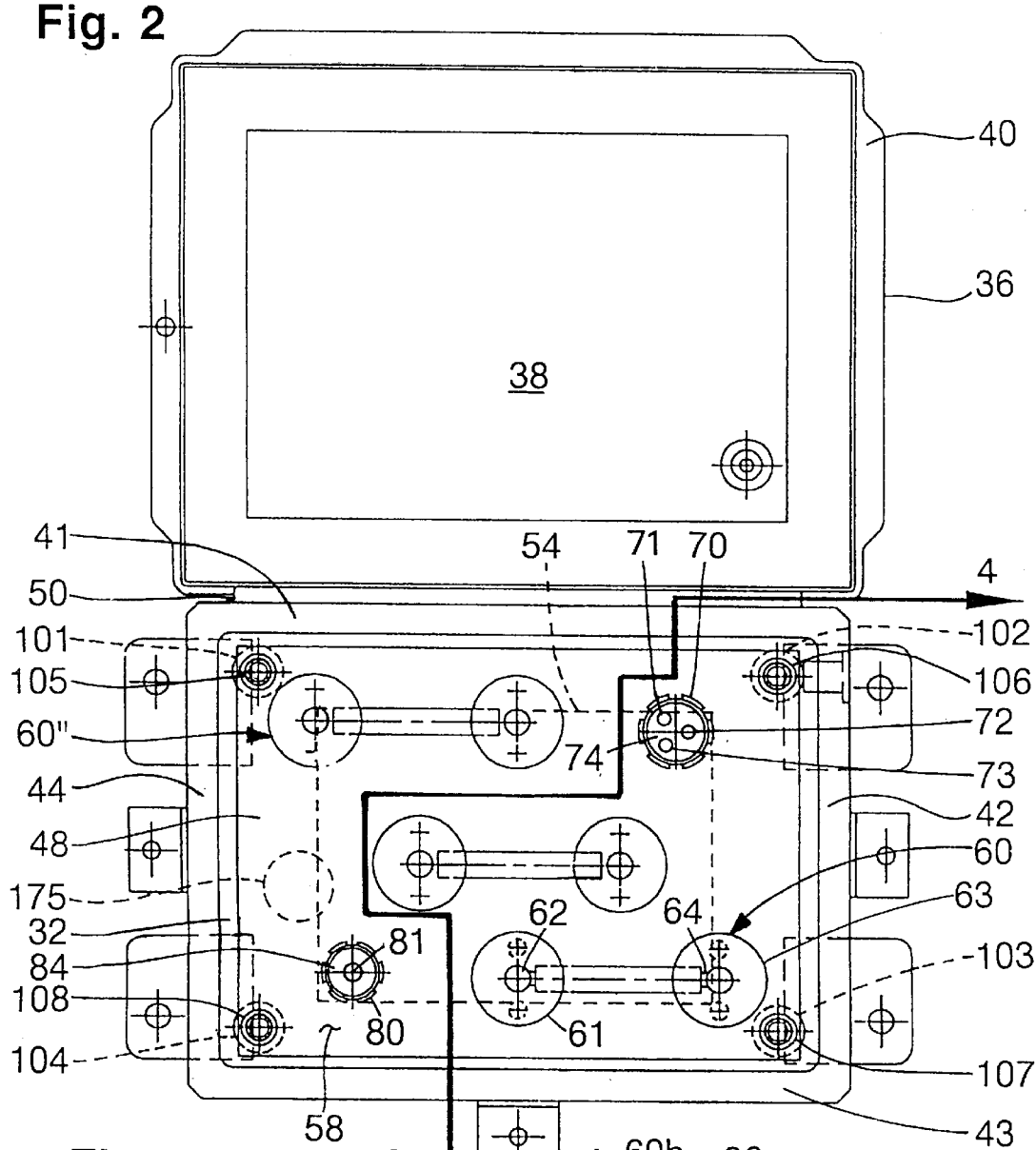
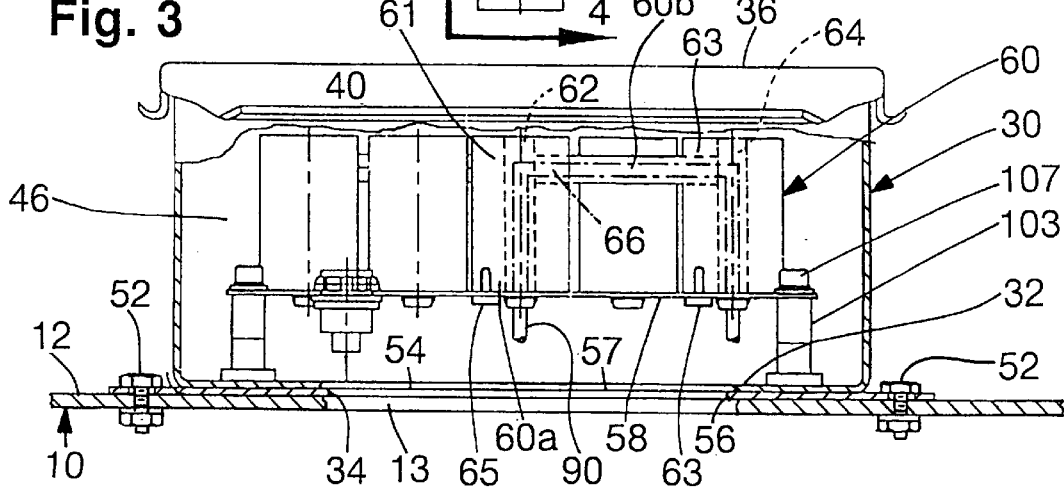

SAFE ELECTRICAL INTERCONNECTION BOX AND METHODS OF SAFE ELECTRICAL INTERCONNECTION

BACKGROUND OF THE INVENTION

The present invention relates to boxes or other receptacles for the safe containment of exposed electrical circuits.

Large polyphase electrical motors are common in many industries including but not limited to the nuclear power industry. Depending upon their use and construction, such motors can require hundreds and even thousands of volts of electrical power for operation. Such motors are often or typically coupled with their high voltage power supplies through protective cabinets or similar enclosures. Such cabinets not only protect the exposed, live or "hot" electrical connections from adverse environmental conditions, they also protect personnel who may have to work in the vicinity of such enclosures from contact with such connections. The cabinets may be safety interlocked or under controlled access to provide further protection from inadvertent openings while the cabinet is energized.

Because of the hazards involved, workers may be required to don special protective gear when working in an energized cabinet. In the nuclear power industry, workers not involved in actual work in the cabinet may, nevertheless be evacuated from the vicinity of the cabinet for safety reasons. Even with protective gear, exposed wires and connections in such cabinets can pose a danger of severe injury and even death to workers. Also, inadvertent contact with live connections in the cabinet could trip the associated motor and possibly cause severe damage to the equipment.

In certain instances, desired maintenance procedures require access to the live connections within an energized motor cabinet. For example, U.S. Pat. No. 5,521,482 to Lang et al., incorporated by reference herein in its entirety, discloses methods and apparatus for determining mechanical performance of polyphase electrical motor systems. These require measurements of the currents and voltages applied to such motors. The measurements are normally taken by clip-on connectors and/or probes, which are attached to energized elements within the cabinet.

These routine maintenance functions can constitute a danger to the operation of the equipment and to the personnel performing the functions.

BRIEF SUMMARY OF THE INVENTION

In one aspect the invention is a safe electrical interconnect box comprising: a rear wall defining a rear side of the box; a front panel defining at least part of a cover on a front side of the box; a plurality of lateral walls, each lateral wall being integral with and projecting transversely between the rear wall and the front panel, the front panel and the plurality of lateral walls defining with the rear wall an enclosed interior space within the box, the cover being coupled with a remainder of the box so as to be sufficiently movable to provide an access opening into the enclosed interior space other than through the rear wall of the box; a plurality of current probe attachment fixtures located within the enclosed interior space, each current probe fixture having a terminal end and a hollow tube portion of electrically insulative material distal to the terminal end, each tube portion being exposed through the access opening and spaced away from the rear wall and away from the tube portion of each other current probe attachment fixture within the interior space; and at least one socket-type electrical connector located within the interior space, one end of the connector bearing at least one electrical connector pin receiving hole facing away from the rear wall and towards the access opening.

In another aspect the invention is a safe interconnect box with a motor cabinet containing a plurality of exposed electrical connections between a polyphase high voltage, electric motor and a polyphase, high voltage power supply, the safe interconnect box comprising: a rear wall positioned juxtaposed to and mounted on an outer wall of the cabinet, the rear wall defining a rear side of the box; a front panel defining at least part of a cover on a front side of the box; a plurality of lateral walls extending transversely between the rear wall and front panel to define an enclosed interior space with the rear wall and the front panel, the cover being coupled with a remainder of the box so as to be sufficiently movable to provide an access opening into the enclosed interior space other than through the rear wall of the box; and at least a first current probe attachment fixture located within the enclosed interior space, the current probe fixture containing a separate electrical conductor extended from a connection with a first phase of the polyphase power supply to the motor, the separate electrical conductor extending in a closed loop through the outer wall of the cabinet and the first fixture back through the rear wall and outer wall.

In yet another aspect, the invention is a method of using the aforesaid combination which comprises the steps of: moving the front cover to provide the access opening into the interior space; coupling each of a plurality of clamp-on current measurement probes to the tube portion of a separate one of the current probe attachment fixtures; and measuring current being passed from the polyphase power supply coupled with the motor while the motor is operating and the cabinet closed using the clamp-on probes.

BRIEF DESCRIPTION OF THE SEVERAL VIEWS OF THE DRAWING

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings, which are diagrammatic:

FIG. 1 depicts in block diagram form the provision of a safe interconnect box on the motor cabinet of a polyphase, high voltage, electric motor coupled with a polyphase high voltage power supply;

FIG. 2 is an elevational view of the box with the front panel of the box open;

FIG. 3 is a partially broken away bottom view of the box; and

FIG. 4 is a partially broken away left side view of the box.

DETAILED DESCRIPTION OF PREFERRED EMBODIMENTS

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the and designated parts thereof. The terminology includes the words above specifically mentioned, derivatives thereof and words of similar import.

In the drawings, like numerals indicate like elements throughout. FIG. 1 depicts a safe interconnect box 30 of the present invention mounted on an outer wall 12 of a motor control cabinet 10 which contains a plurality of exposed electrical connection 14a, 16a, 18a (in phantom) between three lines, 14, 16, 18, which constitute a polyphase, high voltage power supply, and a high voltage, polyphase electric motor 20.

Referring to FIGS. 3 and 4, the box 30 includes a rear wall 32 an outer side of which defines a rear side 34 of the box 30 facing and juxtaposed against the outer wall 12 of the motor control cabinet 10. Referring to FIG. 2, a cover 36 has a central portion which defines a front panel 38 of the box 30. Four lateral walls, 41–44 project transversely from one of the rear walls 32 and front panel 38 towards the other of the rear wall and front panel to define with the rear wall and front panel an enclosed interior of box 30, the interior being indicated generally at 46 in various figures. The lateral walls 41–44 in the depicted embodiment of the invention all project from the rear wall 32 to the front panel 38. However, any of the walls 41–44 might be provided extending from the front panel 38 to the rear wall 32 or may extend from both and meet somewhere in between, as desired. The front panel 38 and cover 36 are coupled with the rear wall 32 so as to move sufficiently to provide an access opening indicated generally at 48 in FIG. 2 into the enclosed interior space 46 other than through the rear wall 32 of the box 30. Preferably, cover 36 includes a circumferential skirt 40, which extends from the outer periphery of panel 38 and overlaps the lateral walls 41–44 when the cover 36 is closed against those walls 41–44. If desired, any of a wide variety of latches and latching mechanisms, which are conventionally used to keep covers of electric circuit boxes or cabinets closed, may be provided on the box 30 to keep the cover 36 closed. Box 30 is preferably permanently mounted to the outer wall 12 of cabinet 10 by suitable means such as, threaded nut and bolt fasteners indicated collectively at 52 in FIG. 3.

At least one opening, indicated at 54 (in phantom in FIG. 2) is provided through the rear wall 32 and juxtaposed to a comparable opening 13 through the outer wall 12 of the motor control cabinet 10 in order to run lines from the interior of the cabinet 10 through the box 30. Suggestedly, a gasket 56 having a central opening 57 is provided between the rear wall 32 and outer wall 12, around the opening 54 through the rear wall 32 and facing opening 13 of the outer wall 12, to prevent physical intrusion between the two walls, as well as the intrusion of dust, dirt, grease, oil and other deleterious or undesirable environmental substances into either the cabinet 10 or box 30.

A plate 58 is preferably located within the enclosed interior space 46 parallel to and spaced from the rear wall 32. The plate 58 supports each of a plurality of preferably identical current probe attachment fixtures, three fixtures 60, 60' and 60" preferably being provided. Plate 58 further preferably supports a multi-hole, socket-type, electrical connector 70 within the interior space 46. Plate 58 further preferably supports a separate, single-hole, socket-type electrical connector 80.

Since each of the three separate current probe attachment fixtures 60, 60' and 60" are the same, only fixture 60 will be described in detail. Fixture 60 comprises a pair of spaced-apart electrically insulated posts 61, 63 which are preferably hollow and project away from both the rear wall 32 of the box 30 and the plate 58. The terminal end of each post 61, 63, is preferably fixedly attached to the plate 58 by suitable means, such as threaded screws 63 extended through the plate and into the terminal end of each post 61, 63. The terminal ends of the posts 61, 63 collectively define the terminal end 60a of the fixture 60. Each post 61 and 63 is preferably provided with a central bore 62, 64, respectively. A hollow cylindrical tube 66 is extended transversely between free ends of the posts 61, 63, between the bores 62, 64 of those posts, to define a tube portion 60b of the fixture 60 distal to the terminal end portion 60a of the fixture. The tube portion 60b of each fixture 60, 60' and 60" is spaced away from the rear wall 32 and the plate 58 and away from the tube portion of each other fixture 60, 60', 60" within the interior space 46. The posts 61, 63 and tube 66 of each fixture can be made from any suitably electrically insulative material including, but not limited to, fiber glass, bakelite, garolite, etc.

The multi-hole, socket-type electrical connector 70 preferably has three connector pin receiving openings or holes 71, 72, 73. The openings 71–73 extend through a face 74 of the connector 70 distal to and facing away from the rear wall 32 and toward the access opening 48 so as to be readily accessible through the access opening. Openings 71–73 receive the three pins of a mating, three pin, plug-type electrical connector 78, indicated in FIG. 4, which is passed through the access opening 48. The end of the connector 70 proximal the rear wall 32 is provided with exposed terminals between the rear wall 32 and plate 58, to be coupled with conductors extended from the motor control cabinet 10 into the box 30.

The single-hole, socket-type electrical connector 80 has one connector pin receiving opening or hole 81. The opening 81 extends through a face 84 of the connector 80 distal to and facing away from the rear wall 32 and toward the access opening 48 so as to be readily accessible through the access opening 48. Opening 81 receives a mating single pin, plug-type electrical connector 88, indicated in FIG. 4, which is passed through the access opening 48. The end of connector 80 proximal the rear wall 32 is provided with an exposed terminal between the rear wall 32 and plate 58, to receive a ground conductor, preferably one extended from the motor control cabinet 10 into the box 30.

The box 30 is assembled and mounted as follows. The cabinet 10 is deenergized and the opening 13 is made through its outer wall 12. Outer wall 12 is preferably a door or other movable/removable panel of the cabinet 10, which normally provides access to the exposed electrical connections 14a, 16a, 18a, etc. within cabinet 10. The box 30 is preferably simply a small, NEMA classified enclosure provided with a cutout through the rear wall 32 defining opening 54. Opening 54 is positioned over the opening 13 provided in the outer wall 12. The box 30 is secured to the outer wall 12 preferably with the gasket 56 positioned there between. Threaded fastening members 101–104, which are preferably internally threaded posts receiving bolts 105–108 but which may be shoulder bolts or conventional bolts with tubular collars, are fixed to the rear wall 32 of the box 30 to project outwardly therefrom and receive the plate 58. The wires 90–95 and 99 are connected to suitable points on or within the cabinet 10 and passed through the opening 13.

Separate electrical conductors in the form of wires 90–92 are preferably extended directly or indirectly from lines 14, 16, 18, carrying the different phases of the power supply extended to the motor 20 through the cabinet 10. Each wire 90–92 is extended from a separate one of the lines 14, 16 and 18. The magnitudes of the currents supplied to the motor 20 are significant in assessing its proper operation. Each of the wires 90, 91 and 92 is passed into the bore 62 of one post 61 of each fixture 60, 60' and 60", across the cylindrical tube 66 and down through the bore 64 of the remaining post 63 and returned to the motor control cabinet 10 for connection so that a preferably rectangular loop of each wire 90–92 is provided from cabinet 10 in box 30 and, more particularly in each fixture 60, 60', 60", respectively. Wires 90–92 are preferably short circuits across current transformers like transformer 116 in FIG. 4, which are permanently installed in cabinet 10 and coupled directly with each of the lines 14, 16 (in phantom in FIG. 4) and 18 constituting the polyphase, high voltage power supply. Wires 90–92 preferably are insulated and are completely encapsulated by the fixture 60, 60', 60".

Electrical conductors preferably in the form of wires 93–95 are extended separately directly or indirectly from each of the separate leads 14, 16, 18 of the power supply and are connected to connector 70 by suitable means such as being soldered to separate terminals provided on the proximal side of the connector 70, which is located between the plate 58 and rear wall 32. If the power supply is over 600 volts, voltage transformers are preferably provided within the motor control cabinet 10 to step the voltages down to 240 or 120 volts and lines 93–95 are run from lines 14, 16, 18 indirectly through such transformers. FIG. 4 depicts one such voltage transformer 128 coupled directly with one phase of the polyphase, high voltage power supply carried by line 18 and coupled with wire 95. The remaining conductor preferably is a separate wire 99 is run from the suitable ground, which may be the motor control cabinet 10, the ground from motor 20 or any other suitable ground.

After the conductor/wire connections are made to the fixture 60, 60' and 60" and connectors 70 and 80, the plate 58 is mounted to the threaded fastening members 101–104 by suitable mating threaded fastening members, 105–108 being shown in FIGS. 2–4. The cabinet 10 is then reclosed. Maintenance measurements are thereafter taken through the box 30 by attaching separate clamp-on current measurement probes 68, 68' in FIG. 4 to tubular portion 60b of each fixture 60, 60' and 60", the three pin mating plug-type connector 78 to the electrical connector 70 and a single pin connector 88 to the single-hole connector 80. With these connections, real time measurement of the motor power supply current and voltage can be safely taken through box 30 while the motor 20 operates and the cabinet 10 is energized.

While the provision of three fixtures 60, 60', 60" and a three-hole connector 70 is disclosed, only two fixtures 60, 60' and a two-hole type electrical connector or two, single-hole type electrical connectors like connector 80 can be provided, if desired, where smaller, two phase motors are to be monitored. A single fixture 60 may be provided in other current monitoring situations. Current probe attachment fixtures 60 et seq. are not commercially available and will have to be made. Hole type pin receiving connectors 70 and 80 are available from any of a variety of sources. The connectors of W. W. Fischer Electronic Connectors, Inc. Atlanta, Ga. are suggested. Extra connector(s) 175, in phantom, single-hole, multi-hole or others may be provided for other monitoring point attachments as may be other current probe attachment fixtures. The wires 90–95 and 99, which are extended from the interior of the motor control cabinet 10 into the box 30, are preferably insulated. Accordingly, wires 90–92 need not be fully enclosed by posts 61, 63. Instead those posts may be used simply to support tubular portion 60b and the insulated wires 90–92 simply extended through openings in the plate 58 on one side of each fixture 60, 60', 60", up the sides of one post of each fixture through the tubular portion 60b and down the remaining post of the fixture through another opening in plate 58 and back into the motor control cabinet 10. It is preferred to extend each wire 90–92 through a separate tubular portion 60b to fit in the center of each probe attached to the tubular portion 60, without physically contacting any of the wires 90–92, to enhance the consistency of the measurements. The fixture enables the current probe(s) 68 to be installed safely (no exposed energized components), easily (no need to bend wires to accommodate the probes), consistently (fixtures 60, 60', 60" align the probe aperture in the same place for every test), and correctly (fixtures 60, 60', 60" can be marked as to phase and high-to-low current flow directions). All of the aforementioned items contribute to provide reliable test data.

The single hole connector 80 is connected to ground wire 99 behind plate 58 so that should the ground wire 99 somehow becomes energized, a live contact is not exposed in the accessible interior space 46.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A safe electrical interconnect box comprising:

a rear wall defining a rear side of the box;

a front panel defining at least part of a cover on a front side of the box;

a plurality of lateral walls, each lateral wall projecting transversely between the rear wall and the front panel, the front panel and the plurality of lateral walls defining with the rear wall an enclosed interior space within the box, the cover being coupled with a remainder of the box so as to be sufficiently movable to provide an access opening into the enclosed interior space other than through the rear wall of the box;

a plurality of current probe attachment fixture located within the enclosed interior space, each current probe attachment fixture having a terminal end and a hollow tube portion of electrically insulative material distal to the terminal end, each tube portion being exposed through the access opening and spaced away from the rear wall and away from the tube portion of each other current probe attachment fixture within the interior space; and at least one socket-type electrical connector located within the interior space, one end of the connector bearing at least one electrical connector pin receiving hole facing away from the rear wall and towards the access opening.

2. The box of claim 1 comprising three separate current probe attachment fixtures within the enclosure.

3. The box of claim 2 wherein the socket connector has three pin receiving holes facing towards the access opening.

4. The box of claim 1 further comprising a separate, single-hole, socket-type electrical connector located within the interior space with a single electrical connector pin-receiving hole facing towards the access opening.

5. The box of claim 1 wherein each fixture comprises a pair of spaced-apart, electrically insulated posts projecting away from the rear wall and the tube portion is extended between distal ends of each pair of the posts.

6. The box of claim 1 further comprising a plate located within the interior space, parallel to and spaced from the rear wall, the plate supporting each of the plurality of fixtures.

7. The box of claim 6 wherein the plate further supports at least the multi-hole, socket-type electrical connector spaced away from the rear wall.

8. The box of claim 7 further comprising a separate, single-hole, socket-type electrical connector supported on the plate within the interior space.

9. In combination with a motor cabinet containing a plurality of exposed electrical connections between a polyphase high voltage, electric motor and a polyphase, high voltage power supply, a safe interconnect box comprising:

a rear wall positioned juxtaposed to and mounted on an outer wall of the cabinet, the rear wall defining a rear side of the box;

a front panel defining at least part of a cover on a front side of the box;

a plurality of lateral walls extending transversely between the rear wall and front panel to define an enclosed interior space with the rear wall and the front panel, the cover being coupled with a remainder of the box so as to be sufficiently movable to provide an access opening into the enclosed interior space other than through the rear wall of the box; and at least a first current probe attachment fixture located within the enclosed interior space and containing a separate electrical conductor extended from a connection with a first phase of the polyphase power supply to the motor, the separate electrical conductor extending in a closed loop through the outer wall of the cabinet and the at least one fixture back through the rear wall and outer wall.

10. The combination of claim 9 wherein the outer wall of the cabinet to which the box is mounted is a movable panel which provides access to the exposed electrical connections within the cabinet.

11. The combination of claim 9 further comprising at least a second current probe attachment fixture containing a second separate electrical conductor extended from a connection with a second, different phase of the polyphase power supply to the motor through separate current transformers within the motor cabinet.

12. The combination of claim 11 further comprising a multi-hole, socket-type electrical connector located within the interior space, one end of the connector bearing multiple, electrical conductor pin receiving holes facing away from the rear wall, the socket-type connector being coupled with each phase of the polyphase power supply to the motor.

13. The combination of claim 12 wherein the multi-hole, socket-type electrical connector is coupled with each phase of the polyphase power supply to the motor through a separate voltage transformer.

14. A method of using the combination of claim 9 comprising steps of:

moving the front cover to provide the access opening into the interior space;

coupling each of a plurality of clamp-on current measurement probes to the tube portion of a separate one of the current probe attachment fixtures; and measuring current being passed from the polyphase power supply coupled with the motor while the motor is operating and the cabinet is closed using the clamp-on probes.

15. The method of claim 14 further comprising the steps of:

connecting a multi-pin, plug-type electrical connector with the multi-hole, socket-type electrical connector; and measuring voltages of the phases of the polyphase power supply coupled with the motor while the motor is operating and the cabinet is closed through the multi-hole electrical connector.

* * * * *